United States Patent
Jackson

(10) Patent No.: US 11,625,261 B2
(45) Date of Patent: *Apr. 11, 2023

(54) SCALABLE ANONYMOUS DISPOSABLE DESKTOPS (SADD)

(71) Applicant: Desmond Armani Jackson, Hayneville, AL (US)

(72) Inventor: Desmond Armani Jackson, Hayneville, AL (US)

(*) Notice: Subject to any disclaimer, the term of this patent is extended or adjusted under 35 U.S.C. 154(b) by 92 days.

This patent is subject to a terminal disclaimer.

(21) Appl. No.: 17/326,689

(22) Filed: May 21, 2021

(65) Prior Publication Data

US 2021/0279091 A1 Sep. 9, 2021

Related U.S. Application Data

(63) Continuation of application No. 16/381,209, filed on Apr. 11, 2019, now Pat. No. 11,042,396.

(60) Provisional application No. 62/655,830, filed on Apr. 11, 2018.

(51) Int. Cl.
  *G06F 9/455* (2018.01)
  *H04L 9/40* (2022.01)
  *H04L 49/354* (2022.01)

(52) U.S. Cl.
  CPC ........ *G06F 9/45558* (2013.01); *H04L 49/354* (2013.01); *H04L 63/205* (2013.01); *G06F 2009/45562* (2013.01); *G06F 2009/45575* (2013.01); *G06F 2009/45587* (2013.01); *G06F 2009/45595* (2013.01)

(58) Field of Classification Search
  CPC ....... G06F 9/45558; G06F 2009/45562; G06F 2009/45575; G06F 2009/45587; G06F 2009/45595; H04L 49/354; H04L 63/205
  See application file for complete search history.

(56) References Cited

U.S. PATENT DOCUMENTS

| | | | |
|---|---|---|---|
| 2006/0112342 A1 | 5/2006 | Bantz et al. | |
| 2014/0123135 A1 | 5/2014 | Huang et al. | |
| 2017/0026383 A1 | 1/2017 | Hayton et al. | |
| 2019/0081930 A1 | 3/2019 | Hunt, IV | |

OTHER PUBLICATIONS

International Search Report and Written Opinion in PCT/US19/27020 dated Jul. 9, 2019, 13 pages.

*Primary Examiner* — Gregory A Kessler
(74) *Attorney, Agent, or Firm* — Rothwell, Figg, Ernst & Manbeck, P.C.

(57) ABSTRACT

Information Security and privacy are the most critical aspects of the internet. The majority of the individuals that have access to the Internet have great difficulty understanding the basics of computers and how they work. This limits the ability of Internet users to protect themselves and their information while browsing the internet. With the creation and testing of SADD (Scalable Anonymous Disposable Desktops), Internet users no longer have to worry about protecting their computer or privacy.

19 Claims, 4 Drawing Sheets

300

302 — Receiving a request from the user device to establish a session with a virtual desktop

304 — Generating a virtual machine comprising the virtual desktop

306 — Establishing an electronic connection between the generated virtual machine and an anonymity network gateway, wherein the anonymity network gateway is in electronic communication with the network

308 — Establishing an electronic connection between the user device and the virtual machine

310 — Setting a time limit, wherein at an expiration of the time limit the generated virtual machine is destroyed

FIG. 3

SCALABLE ANONYMOUS DISPOSABLE DESKTOPS (SADD)

CROSS-REFERENCE TO RELATED APPLICATIONS

This application is a continuation of U.S. application Ser. No. 16/381,209, filed on Apr. 11, 2019, which is a non-provisional of, and claims the priority benefit of, U.S. Provisional Application No. 62/655,830, filed on Apr. 11, 2018, all of which are hereby incorporated by reference in their entirety.

TECHNICAL FIELD

The embodiments disclosed herein relate to an automated system and method for creating self-disposing Virtual Machine instances whose internet connection is routed through the TOR Project's network. More particularly, the created Virtual Machine instances will be disposed of after a certain time period.

BACKGROUND

Virtualization Technology gives users the flexibility to emulate any type of Operating System. For example, emulation allows Windows Operating Systems to run Linux and MAC OS X Operating Systems internally. This emulation is heavily used in Cloud Computing, Cyber-Security, and Business Application Development.

Created by the US Navy, the TOR Project is a free service designed to protect a user's anonymity while browsing the Internet. It does this through a term better known as "onion routing." Onion Routing cryptographically routes an internet connection through multiple proxies to prevent eavesdropping and traffic analysis attacks or hide the user's IP address. One draw-back is if the software is exploited, the real IP of the user will be shown.

SUMMARY OF THE INVENTION

In one embodiment of the present invention, a disposable desktop is provided to a user to test out some malicious software in a safe, isolated, environment.

In one embodiment of the present invention, a disposable desktop is provided to a user to protect their anonymity and provide immunity to exploits while browsing the internet.

According to one aspect, a method for providing a user device anonymous access to a network is provided. The method includes the step of receiving a request from the user device to establish a session with a virtual desktop. The method further includes the step of generating a virtual machine comprising the virtual desktop. The method further includes the step of establishing an electronic connection between the generated virtual machine and an anonymity network gateway, wherein the anonymity network gateway is in electronic communication with the network. The method further includes the step of establishing an electronic connection between the user device and the generated virtual machine. The method further includes the step of setting a time limit, wherein at an expiration of the time limit the generated virtual machine is destroyed.

In some embodiments, the request includes an indication of an operating system, and generating the virtual machine includes generating the virtual machine having the operating system.

In some embodiments, the request comprises the time limit.

In some embodiments, the method includes the steps of receiving a second request at the virtual machine from the user device to access a destination address located on the network; and routing the second request from the virtual machine to the destination address using the anonymity network gateway. In some embodiments, the anonymity network gateway utilizes onion routing to transmit the second request from the virtual machine to the destination address.

In some embodiments, the electronic connection between the virtual machine and the anonymity network gateway includes a virtual local area network connection.

In some embodiments, the method includes the steps of receiving a second request from the user device to destroy the virtual machine; and destroying the virtual machine in response to receiving the second request.

In some embodiments, the method includes the steps of determining that the expiration of the time limit has been reached; and in response to the determining, destroying the virtual machine.

According to another aspect, a non-transitory computer readable medium is provided that stores instructions configured to cause a computer to perform the method described above.

According to another aspect, a system for providing a user device anonymous access to a network is provided. The system includes a processor and a non-transitory computer readable memory coupled to the processor. The processor is configured to receive a request from the user device to establish a session with a virtual desktop. The processor is further configured to generate a virtual machine including the virtual desktop. The processor is further configured to establish an electronic connection between the generated virtual machine and an anonymity network gateway, wherein the anonymity network gateway is in electronic communication with the network. The processor is further configured to establish an electronic connection between the user device and the generated virtual machine. The processor is further configured to set a time limit, wherein at an expiration of the time limit the generated virtual machine is destroyed.

In some embodiments, the request includes an indication of an operating system, and the processor is further configured to generate the virtual machine having the operating system.

In some embodiments, the request comprises the time limit.

In some embodiments, the processor is further configured to: receive a second request at the virtual machine from the user device to access a destination address located on the network; and route the second request from the virtual machine to the destination address using the anonymity network gateway. In some embodiments, the anonymity network gateway utilizes onion routing to transmit the second request from the virtual machine to the destination address.

In some embodiments, the electronic connection between the virtual machine and the anonymity network gateway comprises a virtual local area network connection.

In some embodiments, the processor is further configured to: receive a second request from the user device to destroy the virtual machine; and destroy the virtual machine in response to receiving the second request.

In some embodiments, the processor is further configured to: determine that the expiration of the time limit has been reached; and, in response to the determination, destroy the virtual machine.

In some embodiments, the anonymity network comprises a tor network

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIG. 3 is a method, according to some embodiments.

DETAILED DESCRIPTION OF THE PREFERRED EMBODIMENTS

Figure 1:
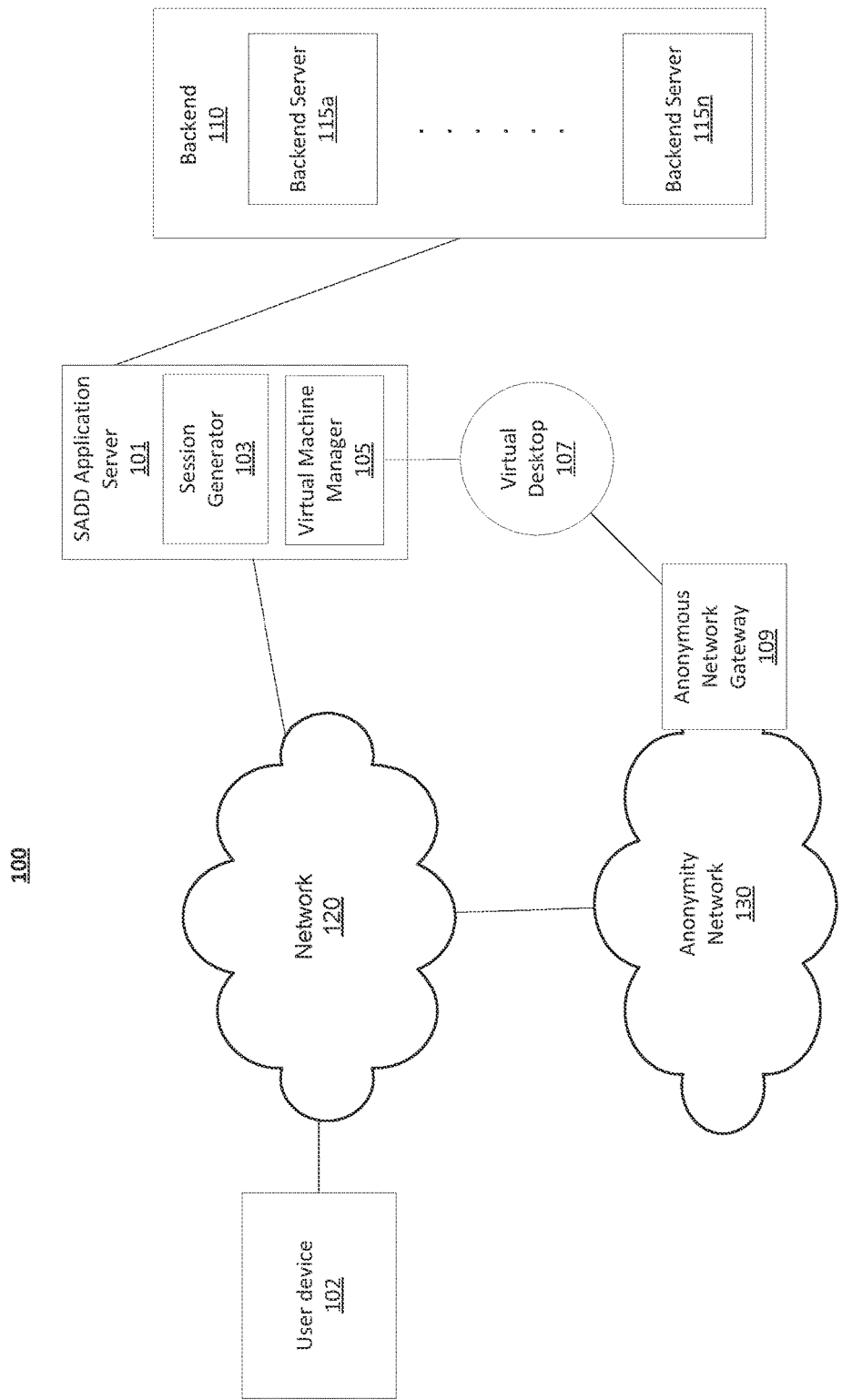
FIG. 1 is a block diagram illustrating a system for scalable anonymous disposable desktops, according to some embodiments.

Reference will now be made in detail to embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Normally when a user is on a public network such as the Internet, there is no anonymity or privacy because the destination website or server would see data coming from the user's IP address. Additionally, when using a VPN, while there may be partial privacy for the user, the destination web site or server would still see data coming from the IP address of the VPN, and it is possible for the user's IP address to be disclosed by the VPN.

In order to address these deficiencies and others, a scalable anonymous disposable desktop (SADD) system and service is disclosed that enables users to anonymously control self disposing desktops. Unlike VPNs, there are no downloads required at a user device, user actions are not logged or recorded, and information may not be required from users to operate the service. According to some embodiments, SADD creates disposable virtual desktops for the users to control. These virtual desktops are destroyed after a user-specified time limit (or provider specified default time limit) and have their own private networks routed through TOR or other anonymity networks. According to some embodiments, this layer of abstraction is what anonymizes the users. Anyone monitoring the user's local area network will think that the users are visiting SADD, while the destination website or server will think the user is using an anonymity network such as TOR. Even if someone were able to break TOR, which is extremely hard to do, they would have to identify users who have no internet fingerprint.

FIG. 1 is a block diagram illustrating a system for scalable anonymous disposable desktops, according to some embodiments. The system 100 may comprise a user device 102, which may be, for example, a device such as a mobile phone, laptop, desktop computer, tablet, or the like. In some embodiments, the user device may be in electronic communication with a scalable anonymous disposable desktop (SADD) application server 101 via a network 120, such as the Internet.

In some embodiments, the SADD application server 101 may comprise a session generator 103 and/or a virtual machine manager 105. The session generator may comprise a module or system that generates a unique session ids for users 102. This helps the SADD application server 101 to know where to send its information. The virtual machine manager may comprise a module or system that creates, modifies, manages, and/or destroys a virtual machine. In some embodiments, the virtual machine may comprise a virtual desktop 107.

In some embodiments, SADD application server 101 may comprise a backend 110, which in turn may comprise one or more backend servers 115a to 115n. In some embodiments, one or more backend servers 115 may comprise one or more of the session generator 103 and/or a virtual machine manager 105. In this respect, according to some embodiments, the SADD application server 101 may be scaled to support a plurality of users 102 by utilizing resources of the backend servers 115 of backend 110. In some embodiments, the virtual machine manager 105 and the session generator 103 may be embodied on the same server or device (e.g., SADD application server 101), or distributed across multiple servers or devices (e.g., one or more backend servers 115a-n of backend 110).

According to some embodiments, the virtual machine manager 105 may be in electronic communication with an anonymous network gateway 109 associated with an anonymity network 130. In some embodiments, the anonymity network 130 comprises TOR. The anonymous network gateway 109 comprises a system or device that can provide access to public network 120 (e.g., the internet) through an anonymity network 130, such as TOR, VPNs, or proxies.

According to some embodiments, the user 102 would gain access to the session generator 101 through a website or computer application hosted by the SADD application server 101. The session generator 109 would generate a session having a session ID, and contact the virtual machine manager 105 with the generated session ID information, user supplied operating system, and a user supplied or system set time-limit. The virtual machine manager 105 may in turn create a virtual machine comprising the virtual desktop 107 with the session ID and operating system type. The virtual machine manager 105 may also start a timer to notify itself of when the virtual machine needs to be destroyed.

The virtual machine manager 105 may also contact the anonymous network gateway 109 and request access to the anonymity network 130, such as a tor network. According to some embodiments, the anonymous network gateway 109 would setup a VLAN per virtual machine to encourage network isolation. This will provide an extra layer of security around all users. Once completed, the anonymous network gateway 109 will reply back to the virtual machine manager 105 with the credentials to the VLAN.

The virtual machine 107 will then connect to that VLAN and send a ready signal back to the session generator 103. The signal would ultimately get sent and displayed to the user 102 along with the generated session ID. The user 102 can then connect to the virtual machine 107 via session id and use it however they please. According to some embodiments, the user 102 may connect to the virtual machine 107, which may in turn anonymously connect to network 120 via network 130.

Upon the virtual machine manager's 105 timer running out, the virtual machine 107 will be destroyed. The virtual machine manager 105 would request that the anonymous network 130 VLAN be destroyed, and optionally display to the user that the session was terminated.

Figure 2:
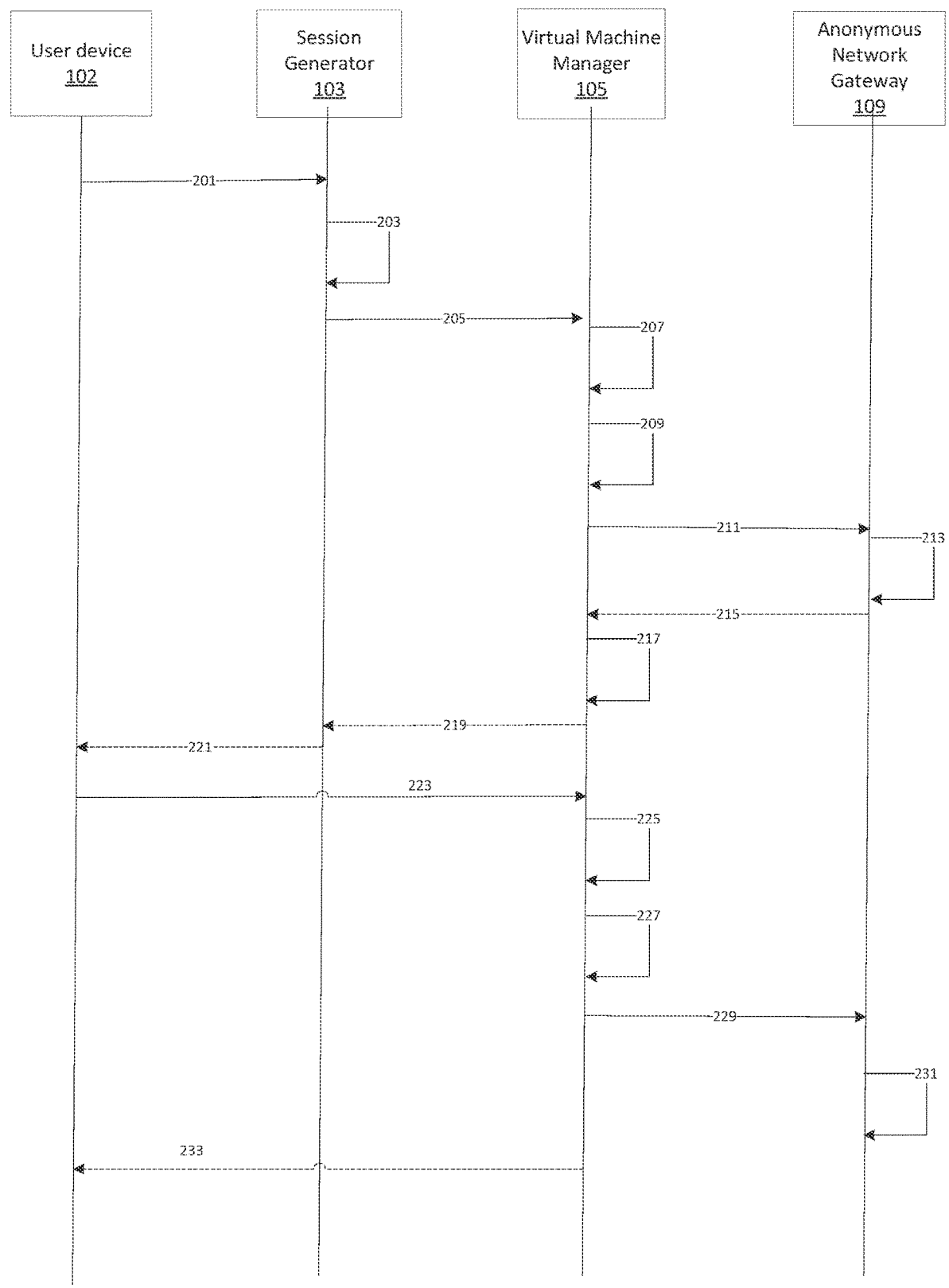
FIG. 2 is a sequence diagram, according to some embodiments.

FIG. 2 is a sequence diagram, according to some embodiments. FIG. 2 is a sequence diagram that shows how a user 102 may interact with the SADD system 100, according to some embodiments. FIG. 2 also describes the back-end operations that may occur, according to some embodiments At 201, the user device 102 transmits to the session generator 103 a request for a unique session. In some embodiments, the request 201 comprises an indication of an operating system, which may comprise, for example, one or more of Ubuntu, *Kali* Linux, Windows, and/or Whonix. In some embodiments the request 201 further comprises a time-limit specifying the maximum duration for the generated virtual machine comprising a virtual desktop.

At 202, the session generator 103 generates a session. In some embodiments, the generated session has a unique session identifier (ID).

At 205, the session generator 103 transmits to the virtual machine manager 105 a request to create a Virtual Machine. In some embodiments, the request 205 comprises the generated session ID. In some embodiments, the request 205 may further comprise an operating system type, such as the operating system type specified in message 201. In some embodiments, the session generator 103 and/or virtual machine manager 105 may use VirtualBox commands to create a virtual machine.

At 207, the virtual machine manager 105 creates and starts a virtual machine. In some embodiments, the created virtual machine comprises a virtual desktop 107.

At 209, the virtual machine manager 105 starts a timer to notify itself when it is time to delete the created virtual machine.

At 211, the virtual machine manager 105 transmits a request to an anonymous network gateway 109 a request to create a virtual local-area-network (VLAN) connection. In some embodiments, the virtual machine manager 105 and/or the anonymous network gateway 109 utilizes Whonix commands to create a gateway, such as a TOR gateway. In some embodiments, VirtualBox commands are used to create a VLAN.

At 213, the anonymous network gateway 109 creates a VLAN connection. In some embodiments, the VLAN is created to provide isolation to each individual user At 215, the anonymous network gateway 109 sends a message comprising the VLAN connection information to the virtual machine manager 105 for configuration. The VLAN connection information may comprises, for example, one or more of an IP address of the VLAN, an IP address of a created virtual machine on the VLAN, and an IP address of the created gateway to the anonymity network.

At 217, the virtual machine manager 105 connects to the VLAN using the received VLAN connection information. In some embodiments, the virtual machine manager 105 utilizes VirtualBox commands to connect the virtual machine to the VLAN and/or the virtual machine to the anonymity network gateway.

At 219, the virtual machine manager 105 sends a ready signal to the session generator 103. In some embodiments, the ready signal 219 comprises an IP address to access the virtual machine and a generated session ID to the virtual machine.

At 221, the session generator 103 transmits the ready signal to the user 102.

At 223, the user device 102 transmits a request towards the virtual machine manager 105 connect to the generated virtual machine. In some embodiments, the request comprises the session ID and/or the IP address to access the virtual machine. In some embodiments, noVNC (web based remote desktop access) or other virtual network computing (VNC) software is used to establish a connection to the virtual machine utilizing the session ID such that the user device 102 can send commands to the generated virtual machine 107.

At 225, the virtual machine manager 105 keeps the session alive between the virtual machine (e.g., virtual desktop) and the anonymous network via the anonymous network gateway 109. While the session is alive, the user device 102 may send commands to the virtual machine and/or virtual desktop. In some embodiments, the commands sent by the user device 102 to the virtual machine and/or virtual desktop cause the generated virtual machine 107 to access a public network 120. In some embodiments, the commands from the user device 102 cause the generated virtual machine 107 to access the public network 120 through the anonymity network 130 via the anonymous network gateway 109. In some embodiments, the virtual machine manager keeps the session alive until the timer runs out.

At 227, when the timer runs out, the virtual machine manager 105 destroys the virtual machine. In some embodiments, VirtualBox commands are used to turn off the virtual machine and/or to turn off the anonymous gateway. In some embodiments, secure-delete on Linux may be utilized to destroy all virtual machine files, which may comprise file shredding at the binary level.

At 229, the virtual machine manager 105 transmits a request to the anonymous network gateway 109 to delete the VLAN connection. In some embodiments, the request 229 may comprise one or more VirtualBox commands to delete a VLAN.

At 231, the anonymous network gateway 109 deletes the VLAN.

At 233, the virtual machine manager sends and displays to the user 102 that the session has been terminated.

FIG. 3 is a method, according to some embodiments. Method 300 is a method for providing a user device 102 anonymous access to a network 120. In some embodiments, method 300 may be performed by SADD application server 101.

At step 302, the SADD application server 101 receives a request from the user device 102 to establish a session with a virtual desktop.

At step 304, the SADD application server 101 generates a virtual machine 107 comprising the virtual desktop.

At step 306, the SADD application server 101 establishes an electronic connection between the generated virtual machine 107 and an anonymity network gateway 109, wherein the anonymity network gateway is in electronic communication with the network 120.

At step 308, the SADD application server 101 establishes an electronic connection between the user device 102 and the generated virtual machine 107.

At step 310, the SADD application server 101 sets a time limit, wherein at an expiration of the time limit the generated virtual machine 107 is destroyed.

Figure 4:
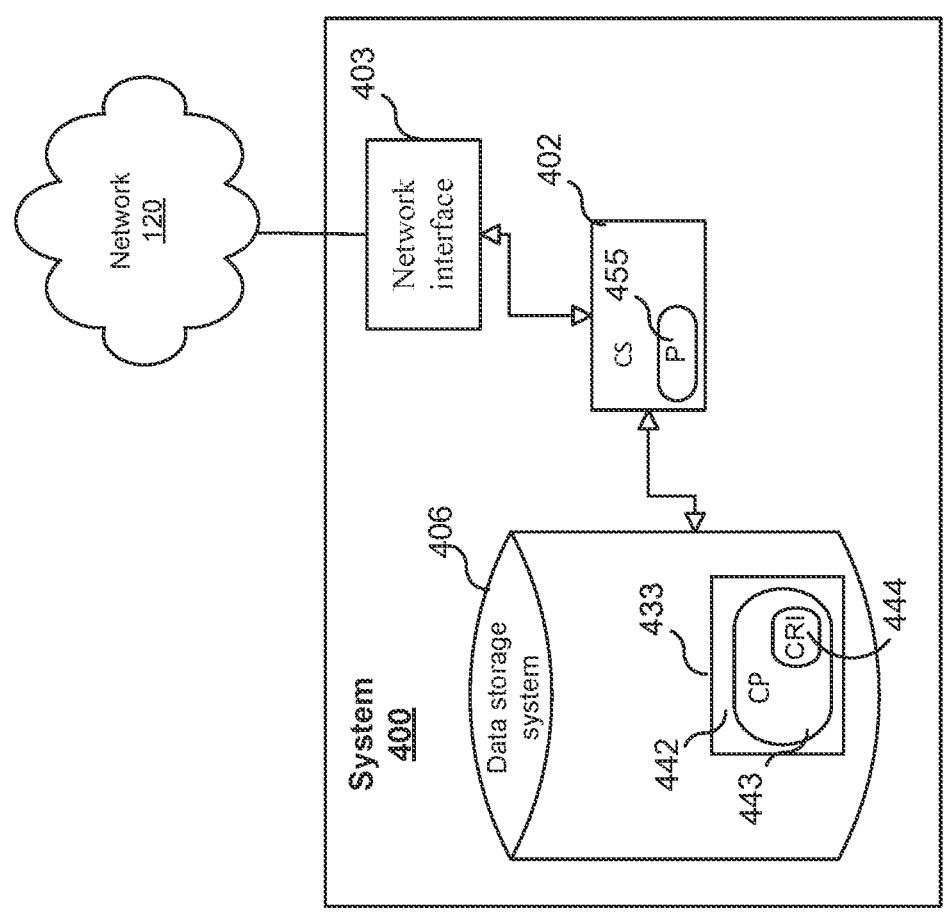
FIG. 4 is a block diagram illustrating a system according to some embodiments.

FIG. 4 is a block diagram illustrating a system, according to some embodiments. In some embodiments, system 400 is SADD application server 101. As shown in FIG. 4, system 400 may comprise: a data processing system (DPS) 402, which may include one or more processors 455 (e.g., a general purpose microprocessor and/or one or more other data processing circuits, such as an application specific integrated circuit (ASIC), field-programmable gate arrays (FPGAs), and the like); a network interface 403 for use in connecting system 400 to network 120 and/or network 130; and local storage unit (a.k.a., "data storage system") 406, which may include one or more non-volatile storage devices and/or one or more volatile storage devices (e.g., random access memory (RAM)). In embodiments where system 400 includes a general purpose microprocessor, a computer program product (CPP) 433 may be provided. CPP 433 includes a computer readable medium (CRM) 442 storing a computer program (CP) 443 comprising computer readable instructions (CRI) 444. CRM 842 may be a non-transitory computer readable medium, such as, but not limited, to magnetic media (e.g., a hard disk), optical media (e.g., a DVD), memory devices (e.g., random access memory), and the like. In some embodiments, the CRI 444 of computer program 443 is configured such that when executed by data processing system 402, the CRI causes the system 400 to perform steps described herein (e.g., steps described above and with reference to the flow charts). In other embodiments, system 400 may be configured to perform steps described herein without the need for code. That is, for example, data processing system 402 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context. It will be apparent to those skilled in the art that various modifications and variations can be made in the method and system for suggesting revisions to an electronic document without departing from the spirit or scope of the invention. Thus, it is intended that embodiments of the invention cover the modifications and variations of this invention provided they come within the scope of the appended claims and their equivalents.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for providing a secure virtual machine over a network, the method comprising:
generating a virtual machine;
establishing an electronic connection between the generated virtual machine and an anonymity network gateway, wherein the anonymity network gateway is in electronic communication with the network through an anonymity network; and
establishing an electronic connection between a user device and the generated virtual machine.

2. The method of claim 1, further comprising:
receiving a request from the user device to establish a session with the virtual machine.

3. The method of claim 2, wherein the request comprises an indication of an operating system type, and wherein generating the virtual machine comprises generating the virtual machine having the operating system type.

4. The method of claim 1, further comprising:
receiving a request at the virtual machine from the user device to access a destination address located on the network; and
routing the request from the virtual machine to the destination address through the anonymity network using the anonymity network gateway.

5. The method of claim 4, wherein the anonymity network gateway utilizes onion routing to transmit the second request from the virtual machine to the destination address through the anonymity network.

6. The method of claim 1, wherein the electronic connection between the virtual machine and the anonymity network gateway comprises a virtual local area network connection.

7. The method of claim 1, wherein the anonymity network comprises a tor network.

8. The method of claim 1, wherein the electronic connection between the user device and the generated virtual machine is over a public network.

9. The method of claim 1, wherein the virtual machine comprises a virtual desktop.

10. A non-transitory computer-readable medium storing instructions configured to cause a computer to perform the method of claim 1.

11. A system for providing a secure virtual machine over a network, the system comprising:
a processor;
a non-transitory computer readable memory coupled to the processor, wherein the processor is configured to:
generate a virtual machine;
establish an electronic connection between the generated virtual machine and an anonymity network gateway, wherein the anonymity network gateway is in electronic communication with the network through an anonymity network; and
establish an electronic connection between a user device and the generated virtual machine.

12. The system of claim 11, wherein the processor is further configured to:
receive a request from the user device to establish a session with the virtual machine.

13. The system of claim 12, wherein the request comprises an indication of an operating system type, and wherein generating the virtual machine comprises generating the virtual machine having the operating system type.

14. The system of claim 11, wherein the processor is further configured to:
receive a request at the virtual machine from the user device to access a destination address located on the network; and
route the request from the virtual machine to the destination address using the anonymity network gateway.

15. The system of claim 14, wherein the anonymity network gateway utilizes onion routing to transmit the second request from the virtual machine to the destination address.

16. The system of claim 11, wherein the electronic connection between the virtual machine and the anonymity network gateway comprises a virtual local area network connection.

17. The system of claim 11, wherein the anonymity network comprises a tor network.

18. The system of claim 11, wherein the electronic connection between the user device and the generated virtual machine is over a public network.

19. The system of claim 11, wherein the virtual machine comprises a virtual desktop.

* * * * *